(12) United States Patent
Miyazaki

(10) Patent No.: US 7,416,487 B2
(45) Date of Patent: Aug. 26, 2008

(54) COMMUNICATION DEVICE, GAME MACHINE, AND COMMUNICATION METHOD

(75) Inventor: Yoshio Miyazaki, Kanagawa (JP)

(73) Assignee: Sony Computer Entertainment Inc., Tokyo (JP)

(*) Notice: Subject to any disclaimer, the term of this patent is extended or adjusted under 35 U.S.C. 154(b) by 832 days.

(21) Appl. No.: 10/826,864

(22) Filed: Apr. 16, 2004

(65) Prior Publication Data
US 2004/0235420 A1 Nov. 25, 2004

(30) Foreign Application Priority Data
Apr. 16, 2003 (JP) .............. 2003-112219

(51) Int. Cl.
*A63F 9/24* (2006.01)

(52) U.S. Cl. .............. 463/39; 463/38; 463/40; 463/42; 273/148 R; 273/148 B; 345/156

(58) Field of Classification Search .............. None
See application file for complete search history.

(56) References Cited

U.S. PATENT DOCUMENTS 6,684,062 B1 * 1/2004 Gosior et al. .............. 455/73

* cited by examiner

*Primary Examiner*—M. A Sager
(74) *Attorney, Agent, or Firm*—Katten Muchin Rosenman LLP

(57) ABSTRACT

A game machine which can be connected with a plurality of wireless controllers is proposed. A game machine according to the present invention holds identification information of wireless terminal equipment in the periphery as a list. The list may be a blacklist specifying equipment not to be connected or, on the contrary, may be a call candidate list specifying equipment to be connected. By using such a list, the establishment of connection with a plurality of wireless controllers can be realized within a short period of time.

16 Claims, 7 Drawing Sheets

FIG.3

| Parity bits | LAP | Undefined | SR | SP | UAP | NAP | Class of device | AM_ADDR | CLK | Page scan mode |
|---|---|---|---|---|---|---|---|---|---|---|
| (34) | (24) | (2) | (2) | (2) | (8) | (16) | (24) | (3) | (26) | (3) (BITS) |

LSB ← → MSB

FIG.6

| Major Device Class | Minor Device Class | | Major Device Class | Minor Device Class | | Major Device Class | Minor Device Class |
|---|---|---|---|---|---|---|---|
| bit12-8 | | | bit12-8 | | | bit12-8 | |
| 0 Miscellaneous | | | 4 Audio/Video | | | 6 Imaging | |
| 1 Computer | | | | bit7-2 | | | bit7-4  Display |
| | bit7-2 | | | 0 Uncategorized | | | bit5  Camera |
| | 0 Uncategorized | | | 1 Device conforms to the Headset Profile | | | bit6  Scanner |
| | 1 Desktop workstation | | | 2 Hands-free | | | bit7  Printer |
| | 2 Server-class computer | | | 3 (reserved) | | | bit3-2 |
| | 3 Laptop | | | 4 Microphone | | | 0 Uncategorized default |
| | 4 Handheld PC/PDA(clam shell) | | | 5 Loudspeaker | | | |
| | 5 Palm sized PC/PDA | | | 6 Headphones | | | |
| | 6 Wearable computer(Watch sized) | | | 7 Portable Audio | | | |
| 2 Phone | | | | 8 Car audio | | | |
| | bit7-2 | | | 9 Set-top box | | | |
| | 0 Uncategorized | | | 10 HiFi Audio Device | | | |
| | 1 Cellular | | | 11 VCR | | | |
| | 2 Cordless | | | 12 Video Camera | | | |
| | 3 Smart phone | | | 13 Camcorder | | | |
| | 4 Wired modem or voice gateway | | | 14 Video Monitor | | | |
| | 5 Common ISDN Access | | | 15 Video Display and Loudspeaker | | | |
| 3 LAN/Network Access point | | | | 16 Video Conferencing | | | |
| | bit7-5 | | | 17 (reserved) | | | |
| | 0 Fully available | | | 18 Gaming/Toy | | | |
| | 1 1 - 17% utilized | | 5 Peripheral | | | | |
| | 2 17 - 33% utilized | | | bit7-6 | | | |
| | 3 33 - 50% utilized | | | 1 Keyboard | | | |
| | 4 50 - 67% utilized | | | 2 Pointing device | | | |
| | 5 67 - 83% utilized | | | 3 Combo keyboard/pointing device | | | |
| | 6 83 - 99% utilized | | | bit5-2 | | | |
| | 7 No service available | | | 0 Uncategorized | | | |
| | bit4-2 | | | 1 Joystick | | | |
| | 0 Uncategorized | | | 2 Gamepad | | | |
| | | | | 3 Remote control | | | |
| | | | | 4 Sensing device | | | |

FIG.7

| Bluetooth_ADDR (48bits) | Class of Device (24bits) |
|---|---|
| 0X110000110000 | 0X080588 |
| 0X120000120000 | 0X080588 |
| 0X130000130000 | 0X080588 |
| ⋮ | ⋮ |

COMMUNICATION DEVICE, GAME MACHINE, AND COMMUNICATION METHOD

BACKGROUND OF THE INVENTION

1. Field of the Invention

The present invention relates to a communication technique, and in particular, to a technique for realizing wireless communication between a master and a slave.

2. Description of the Related Art

A game machine and a game machine controller, which is manipulated by a user, are generally connected with a cable to each other. Recently, however, a system for wirelessly connecting a game machine and a controller has been proposed. By using a wireless controller, a user can enjoy playing a game in a free posture.

In the proposed system, the game machine and the wireless controller are wirelessly connected to each other in a one-to-one relation. The system presupposes that a connection relation is uniquely determined. Therefore, in the case where a plurality of users use the wireless controllers, dedicated transmitting/receiving devices assigned to the respective wireless controllers are required to be attached to the game machine used by the plurality of users. Therefore, since the user has to prepare the wireless controller and the transmitting/receiving device to be attached to the game machine always in a set, the use of the wireless controller becomes troublesome.

SUMMARY OF THE INVENTION

It is an object of the present invention to provide a communication technique for realizing wireless connection between a master and at least one slave.

One aspect of the present invention relates to a communication device which can be wirelessly connected with a plurality of slaves. In the communication device, identification information of a slave which does not satisfy a predetermined condition is registered. For wireless connection, the communication device dose not establish the connection with the slave having the registered identification information. The slave which does not satisfy the predetermined condition means a slave which is not compliant with the communication device functioning as a master. For example, if a used data format is not legitimate, that is, the data format does not satisfy a condition of the data format, the slave is treated as not satisfying the predetermined condition. By excluding the establishment of connection with such a slave, the connection can be established only with an appropriate slave. In addition, the amount of time required to establish the connection can be reduced.

Another aspect of the present invention relates to a game machine which can be wirelessly connected with a plurality of game machine controllers. The game machine comprises: a first receiving section which receives identification information of terminal equipment in the periphery; a control section which registers terminal equipment which does not satisfy a predetermined condition for the game machine in a storage section; and a call section which calls a controller other than the terminal equipment having the identification information registered in the storage section.

A further aspect of the present invention relates to a game machine which can be wirelessly connected with a plurality of game machine controllers. The game machine comprises: a first receiving section which receives identification information of terminal equipment; a control section which registers terminal equipment which does not satisfy a predetermined condition for the game machine in a storage section; and a connection setting section which establishes connection with a controller other than the terminal equipment having the identification information registered in the storage section.

A further aspect of the present invention provides a communication device, which registers identification information of a slave in wireless connection with the slave and calls the slave by using the registered identification information of the slave without making any queries for connection. According to the communication device, since the query for connection is skipped after the identification information of the slave is registered, the amount of time required to establish the connection can be reduced.

A still further aspect of the present invention relates to a game machine which can be wirelessly connected with a plurality or game machine controllers. The game machine comprises: a first receiving section which receives identification information of a controller; a control section which registers the received identification information in a storage section; and a call section which calls the controller based on the identification information. The game machine further comprises a query section which makes a connection query to the periphery of the game machine before the establishment of connection. When the first receiving section receives the identification information transmitted by the controller in the periphery in response to the connection query so that the control section registers the identification information in the storage section, the query section does not have to make any connection queries for next connection establishment. Moreover, when the first receiving section receives the identification information transmitted by the controller in the periphery in response to the connection query so that the control section registers the identification information in the storage section, the query section may make a connection query for a predetermined period of time and interrupt the connection query, when the predetermined period of time elapses, for next connection establishment.

A further aspect of the present invention provides a communication method comprising: registering identification information of a slave in wireless connection with the slave; and calling the slave by using the registered identification information of the slave without making any queries for connection.

A further aspect of the present invention provides a program for making a computer serving as a master to execute, in wireless connection with a slave: a function which makes the computer register identification information of the slave; and a function which makes the computer call the slave by using the registered identification information once the identification information of the slave is registered without making any queries for connection.

A further aspect of the present invention provides a recording medium readable by a computer, which records a program for making a computer serving as a master to execute in wireless connection with a slave: a function which makes the computer register identification information of the slave; and a function which makes the computer call the slave by using the registered identification information once the identification information of the slave is registered without making any queries for connection.

It is to be understood that any combinations of the foregoing components, and expressions of the present invention having their methods, apparatuses, systems, recording media, computer programs, and the like converted mutually are also intended to constitute applicable aspects of the present invention.

This summary of the invention does not necessarily describe all necessary features so that the invention may also be a sub-combination of these described features.

BRIEF DESCRIPTION OF THE DRAWINGS

FIG. 3 is a diagram showing an FHS packet configuration;

FIG. 6 is a diagram showing an example of Class of Device; and

FIG. 7 is a view showing a list of equipment not to be connected, recorded in a list storage section.

DETAILED DESCRIPTION OF THE INVENTION

Figure 1:
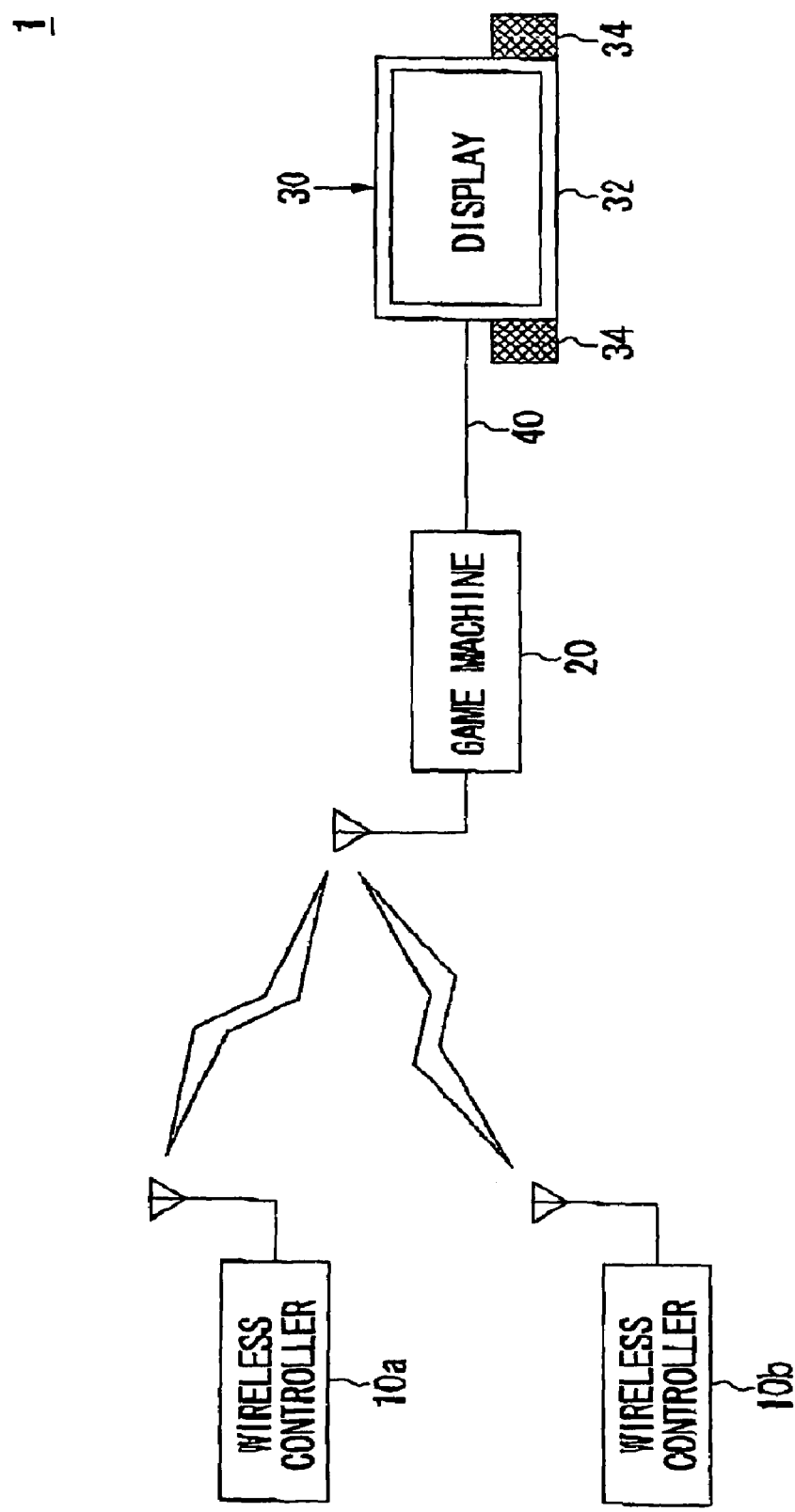
FIG. 1 is a diagram showing the entire configuration of a game system according to an embodiment of the present invention.

FIG. 1 shows the entire configuration of a game system 1 according to an embodiment of the present invention. The game system 1 according to this embodiment includes wireless controllers 10a and 10b for performing wireless communication with a game machine 20 as input interfaces by a user (hereinafter, also collectively referred to as "wireless controllers 10"). The game machine 20 has a wireless communication function. An output device 30 includes a display 32 and a speaker 34. The output device 30 receives AV (Audio Visual) data of a game from the game machine 20 through a network 40 so as to display game video images on the display 32 and to output sounds from the speaker 34.

The game machine 20 and the output device 30 may be connected by a wire or may be wirelessly connected. The network 40 for connecting the game machine 20 and the output device 30 with each other may be embodied as a home network constructed by, for example, a network (LAN) cable, a wireless LAN or the like. In the case where the game machine 20 and the output device 30 are wirelessly connected to each other, the game machine 20 and the output device 30 can be relatively freely installed as compared with the case where the game machine 20 and the output device 30 are connected by a wire such as a cable. Therefore, a user can enjoy playing a game in free location.

The wireless controller 10 and the game machine 20 may establish wireless connection therebetween by using Bluetooth (registered trademark). The game machine 20 can establish wireless connection with the plurality of wireless controllers 10; that is, the connection between the game machine 20 and the wireless controllers 10 can be realized in a one-to-N relation. The game machine 20 functions as a base unit, that is, a master, whereas the wireless controllers 10 function as slaves. As a result, the plurality of wireless controllers 10 can be simultaneously used without attaching dedicated transmitting/receiving devices for the respective wireless controllers 10 to the game machine 20. Hereinafter, Bluetooth is used as a wireless communication protocol. The description will be made for the case where the wireless controllers 10 are Bluetooth terminals.

Figure 2:
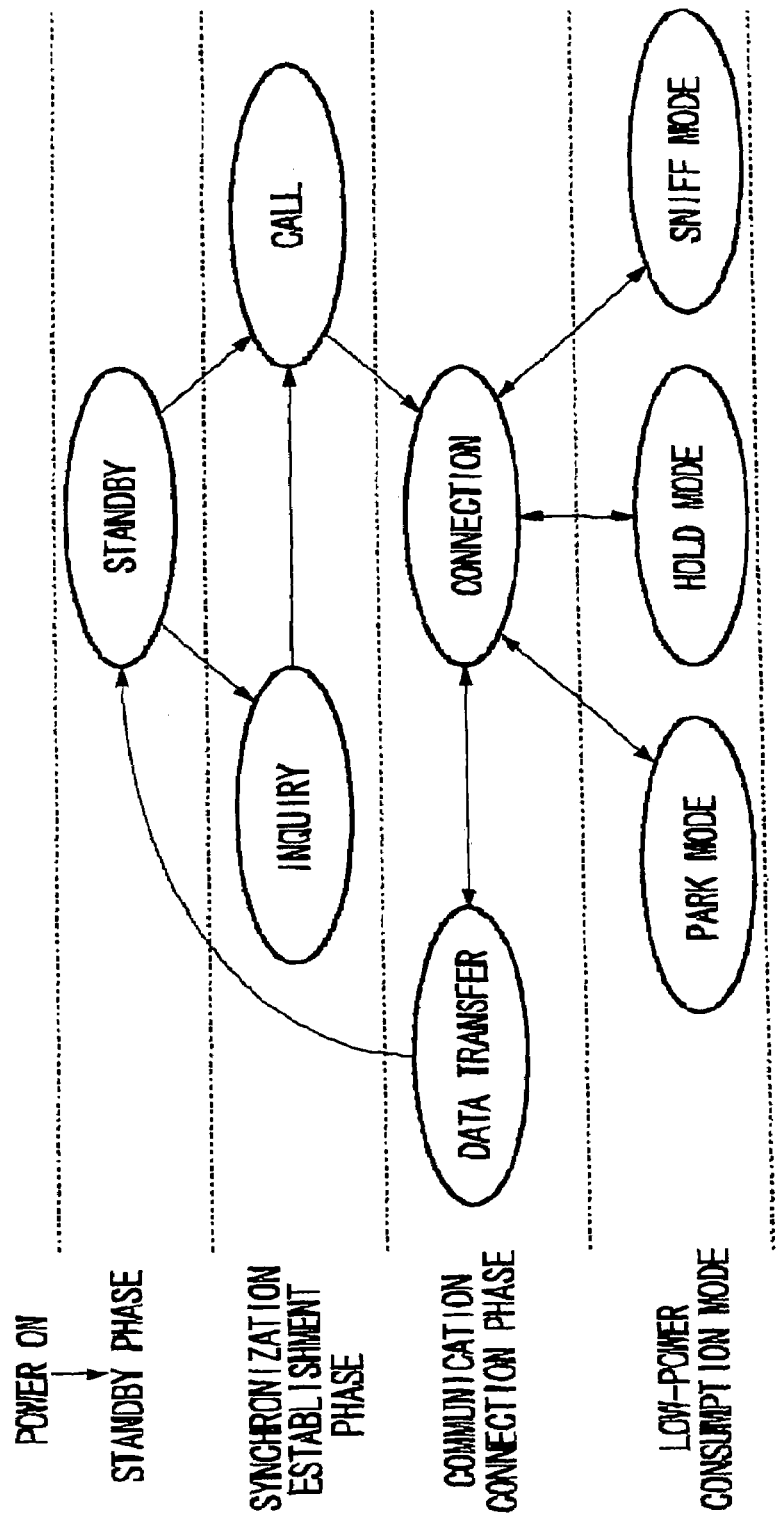
FIG. 2 is a state transition diagram of Bluetooth.

FIG. 2 is a state transition diagram of Bluetooth. As illustrated, states of the Bluetooth terminals can be classified into: a standby phase; a synchronization establishment phase; a communication connection phase; and a low-power consumption mode.

Immediately after power-on of the wireless controller 10 or when a communication link is disconnected, the wireless controller 10 enters a "standby" state. In the "standby state," no transmission/reception of data is performed.

In the synchronization establishment phase, there exist two states of the game machine 20. In one of the states, the game machine 20 makes a connection query, that is, an "inquiry" to terminal equipment including the wireless controllers 10 in the periphery. In the other state, the game machine 20 recognizes the wireless controllers 10 to perform a "call". In the "inquiry" state, the game machine 20 broadcasts an IQ (inquiry) packet to the terminal equipment in the vicinity thereof. The wireless controller 10, which has received the IQ packet, returns an FHS (Frequency Hop Synchronization) packet containing a Bluetooth address and clock information to the game machine 20. Since any mutual agreement on a frequency hopping pattern is not established between the game machine 20 and the wireless controller 10 in the transmission and reception at this time, a fixed hopping pattern defined exclusively for an inquiry is used.

FIG. 3 shows an FHS packet structure. In the packet, an LAP (Lower Address Part), a UAP (Upper Address Part), and an NAP (Non-significant Address Part) constitute Bluetooth_ADDR which corresponds to an address proper to the Bluetooth terminals.

Figure 4:
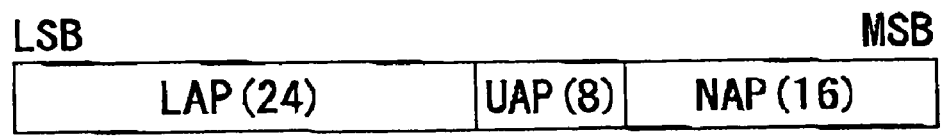
FIG. 4 is a diagram showing a structure of a Bluetooth address (Bluetooth_ADDR)

FIG. 4 shows a structure of the Bluetooth address (Bluetooth_ADDR). The shown Bluetooth address is composed of 48 bits in total; a 24-bit LAP, an 8-bit UAP, and a 16-bit NAP.

Now returning to FIG. 2, in the "call" state, after the game machine 20 receives the FHS packet from the wireless controller 10 so as to recognize which wireless controller 10 is present, the game machine 20 transmits an ID packet to a specific one of the wireless controllers 10. When the game machine 20 receives a response to the ID packet from the specific wireless controller 10, the game machine 20 transmits the FHS packet to the wireless controller 10 so as to inform the wireless controller 10 of its own address and clock of the game machine 20. As a result, the game machine 20 and the wireless controller 10 can share the same hopping pattern.

Upon the "call," a piconet is formed between the wireless controller 10 and the game machine 20 to be in a "connection" state. The piconet means a network temporarily formed between Bluetooth terminals when the terminals are brought close to each other. Up to eight Bluetooth terminals can participate in a single piconet. In a single piconet, the game machine 20 functions as a master so as to establish connection with up to seven wireless controllers 10. In the "connection" state, a control packet for communication link setting is transmitted and received so as to enable "data transfer." When the data transfer is completed to disconnect the communication link, the wireless controller 10 returns to the standby state.

Each of the wireless controllers 10 functioning as slaves can make the transition from the connected state to three types of the low-power consumption mode, that is, a "park mode," a "hold mode," and a "sniff mode." The game machine 20 functioning as a master can make the transition from the connected state to a "hold mode."

The wireless controller 10 in the "park mode" holds the synchronization with the piconet, that is, the synchronization with the hopping pattern and the master clock. However, the wireless controller 10 cannot exchange any packets with the game machine 20. The wireless controller 10 in this state receives data from the game machine 20 at predetermined intervals of time (in a beacon period) so as to immediately participate in the piconet if needed. In the park mode, a slave identifier allocated by the game machine 20, that is, a 3-bit address (1 to 7) given to the wireless controller 10 in connection is temporarily returned to the game machine 20. Therefore, even when the wireless controller 10 wishes to participate in the piconet again, the wireless controller 10 cannot be allowed to participate therein if there is no vacancy for the slave identifier. On the contrary, the machine 20 gives an 8-bit park slave identifier to the wireless controller 10 entering the park mode. The game machine 20 can manage up to 255 parked terminals and can permit only the required wireless controller 10 to occasionally participate in the piconet.

The wireless controller 10 and the game machine 20 in the "hold mode" do not perform any transmission and reception within a set predetermined period of time (hold time) while being in synchronization with the piconet. After elapse of the hold time, the communication is restarted.

The wireless controller 10 in the "sniff mode" can perform transmission and reception at predetermined intervals (sniff intervals). In the rest of time, the power consumption can be held down.

In this embodiment, when the wireless controller 10, which terminates the communication to enter the standby state, starts the communication again, the game machine 20 can make the transition to the call state, skipping the inquiry state. The inquiry is made when the game machine 20 does not recognize which terminal equipment is present in the periphery thereof. The game machine 20 issues broadcast to all the slaves, and then each of the terminals responds to it. In the call state, the game machine 20 has already recognized the presence of the wireless controllers 10. Therefore, the game machine 20 initiates a conversation with each of the slaves in a one-to-one relation so as to establish intra-piconet synchronization. Once the intra-piconet synchronization is established, it is not necessary to execute broadcast at the restart of communication even if the communication is terminated so that the wireless controllers 10 enter the standby state. Since the execution of broadcast takes, for example, 10 seconds or more in some cases, the inquiry is skipped so as to reduce the amount of time required to establish the connection in this embodiment. The phrase "establish the intra-piconet synchronization" means that the game machine 20 and the wireless controllers 10 exchange the Bluetooth address and the clock information so as to synchronize the hopping patterns with each other.

Moreover, in this embodiment, the game machine 20 makes a connection query, that is, an inquiry to the periphery at the establishment of connection so as to record identification information transmitted from terminal equipment in the periphery in response thereto. The identification information of the terminal equipment is used for the subsequent connection establishment so as to reduce the amount of time required for the establishment of communication.

Figure 5:
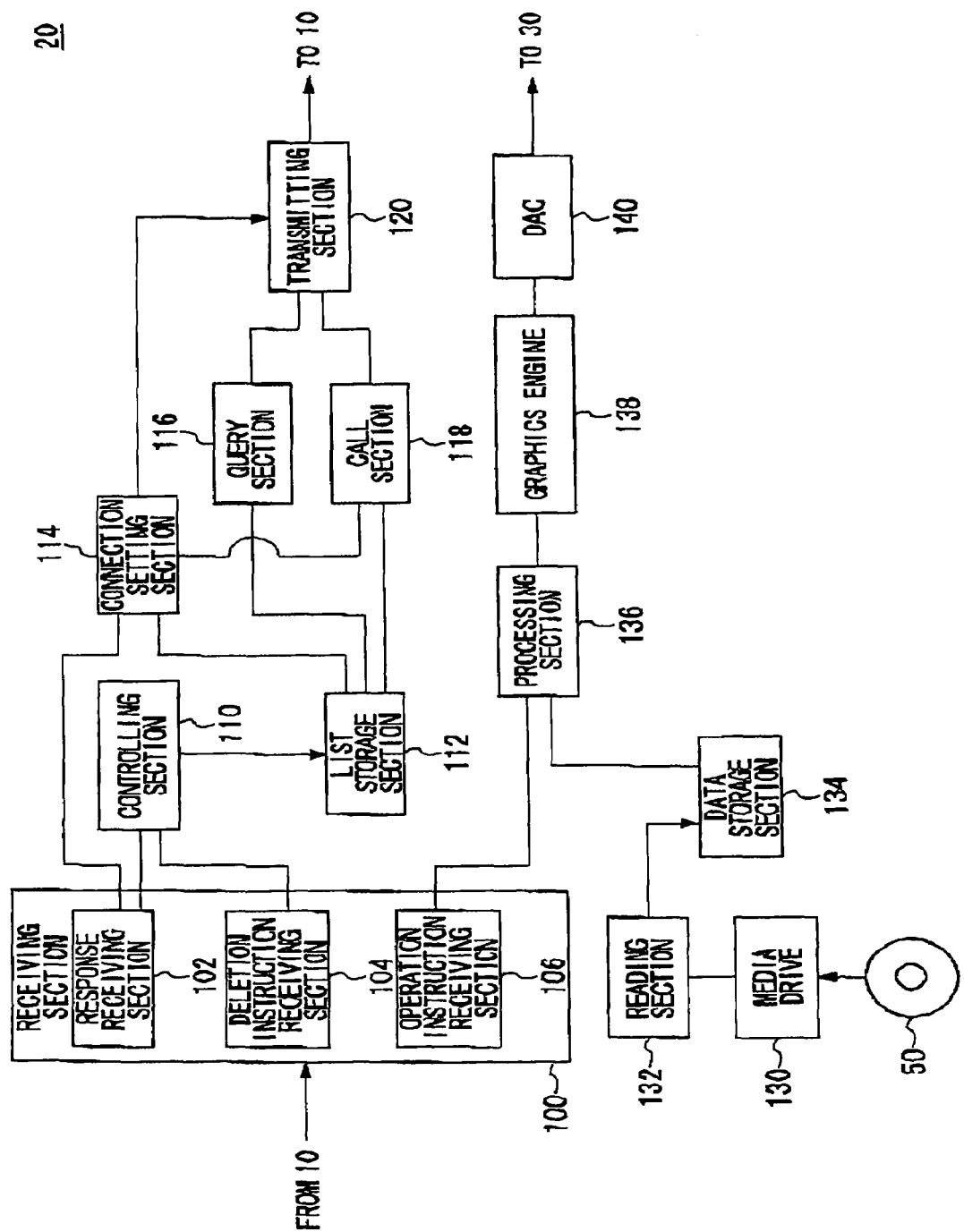
FIG. 5 is a diagram showing the configuration of a game machine according to the embodiment of the present invention.

FIG. 5 shows the configuration of the game machine 20 according to this embodiment. The game machine 20 comprises: a receiving section 100; a control section 110; a list storage section 112; a connection setting section 114; a query section 116; a call section 118; a transmitting section 120; a media drive 130; a reading section 132; a data storage section 134; a processing section 136; a graphics engine 138; and a DA converter 140. The receiving section 100 comprises: a response receiving section 102; a deletion instruction receiving section 104; and an operation instruction receiving section 106. Each of the functions of the game machine 20 is realized by a CPU, a memory, a program loaded onto the memory and the like. In this case, functional blocks realized by the cooperation thereof are illustrated. The program may be included in the game machine 20 or may be stored in a recording medium so as to be externally supplied to the game machine 20. Therefore, it is understood by those skilled in the art that the functional blocks can be embodied in various forms, only by a hardware, only by a software, or by the combination thereof.

A medium 50, on which game data is recorded, is inserted into the media drive 130. The medium 50 is, for example, a CD-ROM or a DVD, and stores the game data such as AV data of game scenes or a game program. The game program recorded onto the medium 50 may be in a form which is directly executed by the processing section 136 or may be in a form which is executable by the processing section 136 after decoding. The media drive 130 drives the medium 50. The reading section 132 reads out the game data recorded onto the medium 50 to the data storage section 134. The processing section 136 executes the readout game data.

In the case where wireless connection is established between the game machine 20 and the wireless controller 10, the operation instruction receiving section 106 receives an operation instruction of a game from the wireless controller 10 so as to transmit it to the processing section 136. The processing section 136 processes the game data based on the operation instruction by a user. Then, the graphics engine 138 generates AV data of the game based on the game data processed by the processing section 136. The AV data of the game is generated as digital data. The DA converter 140 converts the digital data into an analog signal so as to supply it to the output device 30. As a result, the display 32 and the speaker 34 output video images and sounds reflecting the operation of the game by the user.

The above-description has been made, presupposing that the wireless connection is established between the game machine 20 and the wireless controllers 10. Hereinafter, examples for establishing the wireless connection will be described.

EXAMPLE 1

In Example 1, the connection with terminal equipment which is not compliant with the game machine 20 is effectively avoided so as to reduce the amount of time required for the establishment of connection with the wireless controllers 10. In the environment of use or Bluetooth, even terminal equipment which is not compliant with the game machine 20 can respond to an inquiry from the game machine 20 as long as the terminal equipment is compliant with Bluetooth. Therefore, in Example 1, the establishment of connection is controlled so that the game machine 20 is not connected with, for example, the wireless controller 10 which is not permitted for use. The connection with the non-compliant wireless controller 10 is avoided so as to prevent the use of a spoofing appliance supplied from an illicit manufacturer.

First, the game machine 20 can perform filtering of different types of terminal equipment by using a Class of Device of the FHS packet shown in FIG. 3. The Class of Device is a field indicating the type of terminal equipment.

FIG. 6 shows an example of the Class of Device. The game machine 20 can filter functional groups by using this field. If the field has a value other than a predetermined value, the game machine 20 recognizes that the terminal equipment returning the FHS packet is not a wireless controller.

Returning to FIG. 5, when the query section 116 makes an inquiry to terminal equipment in the periphery, the response receiving section 102 receives the FHS packet returning from the terminal equipment. Then, the control section 110 analyzes the Class of Device of the FHS packet. When the control section 110 recognizes that the terminal equipment returning the FHS packet is not the wireless controller 10 which is compliant with the game machine 20, identification information of the terminal equipment is recorded in the list storage section 112. The recorded identification information is used as a so-called blacklist. The call section 118 of the game machine 20 does not make any calls to the blacklisted terminal equipments.

Returning to FIG. 2, in the connection state, the transmission and reception of the data packet are not performed. The transmission and reception are limited to a control packet for setting the communication link, a security-associated control packet, a low-power consumption mode-associated control packet and the like. In the connection state, an application for authentication between the game machine 20 and the wireless controller 10 can be executed. The response receiving section 102 receives a response from equipment in the periphery. The control section 110 may record the identification information of equipment which fails to be authenticated in the list storage section 112 as a blacklist.

After the game machine 20 transmits/receives the control packets in the connection state, the game machine 20 makes the transition to a data transfer mode. In the data transfer mode, a format of data is set to be peculiar to the game machine 20. In the thus set format, data is transmitted and received.

In the data transfer mode, if the slave returns unexpected ACK, the game machine 20 determines that the slave is not equipment to be connected. Therefore, the game machine 20 registers identification information owned by the equipment on the blacklist while disconnecting the connection with the equipment. More specifically, the response receiving section 102 receives ACK from the slave so that the control section 110 determines whether ACK is in a predetermined data format or not. If not, the identification information of the terminal equipment, in this case, an address of the terminal equipment is recorded in the list storage section 112. The determination is made by an upper application layer The control section 110 records addresses of all equipments not to be connected as a list. The connection setting section 114 disconnects the connection with the equipment registered on the list.

FIG. 7 shows a list of equipments not to be connected, recorded in the list storage section 112. The list is generated in such a manner that a 48-bit Bluetooth address (Bluetooth_ADDR) and Class of Device are correlated with each other. The addresses of illegitimate wireless controllers whose Class of Device is indicated by 0X080588 are recorded on the list illustrated in FIG. 7. In practice, however, a list is made in the same manner for different types of terminal equipment in the periphery of the game machine 20.

When the game machine 20 is powered ON again so as to establish the connection with the wireless controller 10, it is possible to filter the slave with reference to the information obtained from the slave in response to the inquiry and the blacklist recorded in the list storage section 112. More specifically, when the power is turned ON again, the query section 116 makes an inquiry to terminal equipment in the periphery through the transmitting section 120. The response receiving section 102 receives the FHS packet from the terminal equipment in the periphery. The connection setting section 114 determines whether the connection is allowed or not, with reference to the identification information of the terminal equipment contained in the FHS packet and the list of the equipments not to be connected, recorded in the list storage section 112. If the terminal equipment returning the FHS packet does not correspond to equipment to be connected, the call section 118 does not make any calls for the terminal equipment. More specifically, the call section 118 calls the wireless controller 10 other than the terminal equipment having the identification information registered in the list storage section 112, based on the information obtained from the terminal equipment in the periphery in response to the inquiry. Owing to the reference to the blacklist, it is not necessary to perform an analysis process of data in the upper application layer for each time, where the analysis process is performed after the transition from the data transfer mode. Therefore, since non-compliant terminal equipment can be easily excluded from call candidates. As a result, the amount of time required to establish the connection can be reduced. In addition, power consumption can be held down. The connection setting section 114 establishes the connection with the wireless controller 10 other than the terminal equipment having the identification information registered in the list storage section 112.

The priority order may be determined for equipments not to be connected, which are recognized as ones to be listed at each inquiry. More specifically, it may be determined that the terminal equipment registered on the blacklist is registered thereon by chance or is resident in the environment. As a result, the listed equipments with a low priority, which are not frequently detected as equipments not to be connected, can be eliminated from the list 90 so as to reduce the amount of data of the list. Therefore, the reference time of the list can be reduced so as to further reduce the amount of time required to establish the connection. The user can direct to delete the register of terminal equipment registered in the list storage section 112. The register deletion instruction is received by the deletion instruction receiving section 104. The control section 110 deletes corresponding identification information from the list storage section 112 based on the register deletion instruction. As a result, the amount of data of the list can be reduced to reduce the reference time of the list as described above.

In the example described above, the game machine 20 carries out the filtering of the terminal equipments based on the Class of device. The filtering may be, however, performed based on the Bluetooth addresses shown in FIG. 7. In utilizing the Bluetooth addresses, the game machine 20 may carry out the filtering of the terminal equipments based on both the class of Device and the Bluetooth addresses. In any case, it becomes possible to list the terminal equipments not to be connected, i.e. to prepare the blacklist, by utilizing ID information for identifying the terminal equipments.

EXAMPLE 2

In Example 2, the connection between the game machine 20 and the wireless controller 10 compliant with the game machine 20 is efficiently realized so as to reduce the amount of time required to establish the connection with the wireless controller 10. In Example 1, the addresses of the terminal equipments which are not compliant with the game machine 20 are held as a blacklist. In Example 2, however, the address of the wireless controller 10 compliant with the game machine 20 is registered in advance as a call candidate list. As a result, the game machine 20 can makes a call without any queries so as to establish the connection within a short period of time.

In Example 2, it is necessary for the game machine 20 to know in advance, identification information of the wireless controller 10, in this case, Bluetooth_ADDR which is proper to Bluetooth terminals. In the case where the game machine 20 and the wireless controller 10 are sold as a set, the identification information of the wireless controller 10 may be registered in the list storage section 112 of the game machine 20 in advance.

When the game machine 20 is powered ON, the game machine 20 makes a call to Bluetooth_ADDR registered in the list storage section 112. If the registered wireless controller 10 is present in the periphery of the game machine 20, the connection can be established within a short period of time by a response of the wireless controller 10 to the call.

If the identification information of the wireless controller 10 is not registered in the list storage section 112 of the game machine 20 when the game machine 20 is powered ON, the query section 116 makes a connection query, that is, an inquiry through the transmitting section 120. The terminal equipment in the periphery returns a response. In Example 1, the identification information of the terminal equipment returning unexpected ACK is recorded as a blacklist. On the other hand, in Example 2, the control section 110 records the identification information of the terminal equipment returning ACK in accordance with the predetermined data format in the list storage section 112 as a call candidate list. Therefore, the list storage section 112 holds, for example, the identification information of the wireless controller 10 distributed by a legitimate manufacturer.

After the control section 110 registers the identification information of the legitimate wireless controller 10 in the list storage section 112, the query section 116 does not make any connection inquiries for next connection establishment, for example, when the power is turned ON next time. The call section 118 directly makes a call to the wireless controller 10 registered on the call candidate list so as to allow the connection query, that is, the inquiry to be skipped, thereby reducing the amount of time required to establish the connection. For example, the connection query may be made at the first power-ON, so that the call section directly makes a call without any connection inquiries at the subsequent power-ON. For example, a button for operating the query section 116 may be provided for a main body of the game machine 20. When a user presses the button, the query section 116 is controlled to make a connection query, that is, an inquiry.

Moreover, the query section 116 may make a connection query for a predetermined period of time for next connection establishment and interrupt the connection query when the predetermined period of time elapses. By setting a certain limit for search time for the wireless controller 10 in the periphery, any situations where the connection query takes long time can be avoided. When the predetermined period of time elapses, the connection query is interrupted so that the call section 118 makes a call to the wireless controller 10 registered on the call candidate list.

A user is allowed to freely make addition to and deletion from the call candidate list and the like. When the user directs to delete the register of the wireless controller registered in the list storage section 112 by using the wireless controller 10, the register deletion instruction is received by the deletion instruction receiving section 104. Subsequently, the control section 110 deletes corresponding identification information from the list storage section 112. The addition of the wireless controller 10 to the call candidate list can be made in the same manner; the control section 110 can register corresponding identification information in the list storage section 112 based on an instruction of addition by the user. As a result, the user can independently add or delete the specific wireless controller 10 to or from the call candidate list without performing any inquiry processes by the query section 116. In this case, the naming of Bluetooth_ADDR or the like facilitates the management by the user. Moreover, as described above, the connection query by the game machine 20 may be made at arbitrary timing by pressing the button for operating the query section 116, which is provided on the main body of the game machine 20.

Next, it is assumed that the preregistered wireless controller 10 and the new wireless controller 10 are simultaneously connected to the game machine 20. When the game machine 20 is powered ON, a call is automatically made to the wireless controller 10 registered in the call candidate list so as to establish the connection. After the completion of the establishment of connection with the registered wireless controller 10, the game machine 20 enters the data transfer mode with respect to the registered wireless controller 10. For the new wireless controller 10, a period of time, in which a connection query and a call are made, is provided. This period of time may be set in accordance with, for example, the amount of time required for the game machine 20 to complete booting, that is, the amount of time before a key input is prompted in a game or the amount of time before an actual start of the game and the like.

The amount of time before a key input is prompted is long enough to establish the connection with the new wireless controller 10. Since the amount of time before the start of the game is longer, such an amount of time may be ensured for the case, for example, where a large number of new wireless controllers are present. The game normally requests a user to set a character and the like at the start of the game. This configuration takes advantages of the fact that, in this period of time, latency in the communication is relatively moderate between the game machine 20 and the wireless controller 10. When the connection is established with the new wireless controller 10, the controller 110 registers identification information of the new wireless controller 10 in the list storage section 112. As a result, for the subsequent connection establishment, a call to the newly added wireless controller 10 can be made by using the call candidate list without making any queries or with an inquiry for a predetermined short period of time. Accordingly, the amount of connection time can be reduced.

In the embodiment described above, for example, the connection is controlled in an application layer. As another embodiment, the connection may be controlled in a link management layer, which is a lower layer than the application layer. In the Bluetooth protocol, security management is carried out based on a link key. The security parameters of each terminal equipment are precedently registered based on the link key set between a master and a slave in establishing the connection therebetween. The terminal equipment carries out connection authentication based on those parameters and, when a terminal equipment having authentication error is found as a result of the connection authentication, the ID information of such terminal equipment may be registered in a blacklist stored in a database of the link management layer. Accordingly, it becomes possible to determine whether the connection can be established or not before the processing in the upper layer, i.e. the application layer.

As another embodiment, a list (hereinafter referred to as a "graylist") for candidates of terminal equipments to be registered in a blacklist may be prepared before generating the blacklist in the application layer. The graylist my be generated based on, for example, the intensities of radio waves received in the master. In the graylist, are registered terminal equipments of which the intensities of radio waves received at the master are lower than a predetermined threshold value. If the number of times that a terminal equipment is successively listed in the graylist exceeds a predetermined number in the next and subsequent connection processings, such terminal equipment is registered in the black list. For the terminal equipments registered in the black list, the master does not carry out Inquiry and the connections thereto are not established.

In this another embodiment, it is preferable that, even though a terminal equipment is once registered in the graylist, such terminal equipment is eliminated therefrom before being registered in the blacklist when the intensity of the radio wave from the terminal equipment exceeds the predetermined threshold. This is because a user him/herself will generally try to improve connection status by moving to a position where the intensity can be increased, when the intensity is low. The registration of the terminal equipment to the blacklist must be carried out carefully and thus the above-described predetermined number may be set to a relatively large number, such as several tens.

Still, as another embodiment, a master may store a blacklist downloaded from outside thereof. The blacklist may be downloaded via a radio channel or via a wired channel. When terminal equipments not to be connected are precedently known, the master can skip generating for itself a blacklist, by importing a list of such terminal equipments from outside. In this case, it is preferable that the master itself is provided with a function of generating the blacklist and the download of the blacklist from outside is carried out secondarily in accordance with a situation.

The present invention has been described above based on the embodiments. These embodiments are given solely by way of illustration. It will be understood by those skilled in the art that various modified examples may be made of combinations of the foregoing components and processes, and all such modified examples are also intended to fall within the scope of the present invention.

What is claimed is:

1. A communication device which can be wirelessly connected with a plurality of terminal equipment units, comprising:
   a first receiving section which receives identification information of at least one terminal equipment unit;
   a control section which decides to register the identification information of the at least one terminal equipment unit according to whether or not the at least one terminal equipment unit satisfies a predetermined condition for the communication device on a list in a storage section; and
   a call section adapted to selectively call one of terminal equipment units on the list and terminal equipment units not on the list.

2. The communication device according to claim 1, wherein the control section registers the identification information of the at least one terminal equipment unit which does not satisfy the predetermined condition on the list; and
   the call section calls at least one further terminal equipment unit other than the at least one terminal equipment unit having the identification information registered on the list.

3. The communication device according to claim 1, wherein the control section registers the identification information of the at least one terminal equipment unit which satisfies the predetermined condition on the list; and
   the call section calls the at least one terminal equipment unit registered on the list without making any queries for connection.

4. The communication device game according to claim 1, wherein the control section generates the list of the at least one terminal equipment unit not to be connected or to be connected.

5. A game machine which can be wirelessly connected with a plurality of game machine controllers, comprising:
   a first receiving section which receives identification information of at least one terminal equipment unit in the periphery;
   a control section which registers the identification information of the at least one terminal equipment unit not to be connected with the game machine on a list in a storage section; and
   a call section which calls a controller other than the at least one terminal equipment unit having the identification information registered on the list.

6. The game machine according to claim 5, further comprising a second receiving section which receives a register deletion instruction of the at least one terminal equipment unit registered on the list,
   wherein the control section deletes corresponding identification information from the list based on the register deletion instruction.

7. A game machine which can be wirelessly connected with a plurality of game machine controllers, comprising:
   a first receiving section which receives identification information of a controller;
   a control section which registers the received identification information on a list of controllers to be connected with the game machine in a storage section; and
   a connection setting section which establishes connection with the controller having the identification information registered on the list.

8. The game machine according to claim 7, further comprising a query section which makes a connection query to the periphery of the game machine before the establishment of connection,
   wherein, when the first receiving section receives the identification information transmitted by the controller in the periphery in response to the connection query so that the control section registers the identification information on the list, the query section does not make any connection queries for next connection establishment.

9. The game machine according to claim 7, further comprising a query section which makes a connection query to the periphery of the game machine before the establishment of connection,
   wherein, when the first receiving section receives the identification information transmitted by the controller in the periphery in response to the connection query so that the control section registers the identification information on the list, the query section makes a connection query for a predetermined period of time and interrupts the connection query, when the predetermined period of time elapses, for next connection establishment.

10. The game machine according to claim 7, further comprising a second receiving section which receives a register deletion instruction of the controller,
    wherein the control section deletes corresponding identification information from the list based on the register deletion instruction.

11. The game machine according to claim 7, wherein identification information of a controller is registered in the storage section in advance in a case where the game machine and the controller are sold as a set.

12. A communication method comprising:
    receiving identification information of at least one terminal equipment unit;
    deciding to register the identification information of the at least one terminal equipment unit according to whether or not the at least one terminal equipment unit satisfies a predetermined condition on a list in a storage section; and calling selectively one of terminal equipment units on the list and terminal equipment units not on the list.

13. A program for making a computer serving as a master to execute, in wireless connection with at least one terminal equipment unit, comprising:

a function which makes the computer decide to register identification information of the at least one terminal equipment according to whether or not the at least one terminal equipment unit satisfies a predetermined condition on a list in a storage section; and a function which makes the computer call selectively one of terminal equipment units on the list and terminal equipment units not on the list.

14. A recording medium readable by a computer, which records a program for making a computer serving as a master to execute in wireless connection with at least one terminal equipment unit:

a function which makes the computer decide to register identification information of the at least one terminal equipment unit according to whether or not the terminal equipment satisfies a predetermined condition on a list in a storage section; and a function which makes the computer call selectively one of terminal equipment units on the list and terminal equipment units not on the list.

15. A game machine which can be wirelessly connected with a plurality of game machine controllers, comprising:

a first receiving section which receives identification information of at least one terminal equipment unit;

a control section which registers the identification information of the at least one terminal equipment unit not to be connected with the game machine on a list in a storage section; and a connection setting section which establishes connection with a controller other than the at least one terminal equipment unit having the identification information registered on the list.

16. The game machine according to claim 15, further comprising a second receiving section which receives a register deletion instruction of the at least one terminal equipment unit registered on the list, wherein the control section deletes corresponding identification information from the list based on the register deletion instruction.

* * * * *